2,946,740

DEACTIVATION OF POISONS ON CONTAMINATED CRACKING CATALYSTS

Albert N. De Vault, Bartlesville, Okla., assignor to Phillips Petroleum Company, a corporation of Delaware No Drawing. Filed Apr. 22, 1958, Ser. No. 730,046
5 Claims. (Cl. 208—120)

This invention relates to the deactivation of poisons on contaminated cracking catalysts which have been used for conversion of hydrocarbon materials. In one of its aspects, the invention relates to the contacting of a poisoned or used cracking catalyst with chromyl chloride ($CrO_2Cl_2$). In another of its aspects, the invention relates to the contacting of a cracking catalyst at elevated temperature with chromyl chloride vapors. More specifically, the invention relates to a catalytic operation in which a catalyst is employed to crack a hydrocarbon and wherein the catalyst when it has become "coked" is regenerated under regeneration conditions and wherein the catalyst at a point in the operation is contacted with chromyl chloride vapors.

In the preliminary treatment of crude oils in their preparation as cracking stock there are performed certain conventional distillation operations. In these operations there are obtained fractions of certain oils such as gas oil in which will be found concentrated a substantial proportion of certain catalyst poisons which are found in the original crude oil. These poisons include among others, certain compounds of nickel, vanadium, etc. These metals can be present as inorganic salts but also can be present in certain combinations or complexes of organic materials. During the cracking operation, which as is well known is conducted at an elevated temperature, usually above approximately 700° F., the various metals contained in the oil being converted deposit on the catalyst modifying the same to increase its capacity to produce hydrogen, dry gas and coke. To the extent that increased quantities of hydrogen, dry gas, coke and other undesirable materials are formed there is a corresponding loss of charge which can be converted to gasoline or other useful products. Furthermore, since most cracking units are limited in their charge rate by the regenerating capacity available for regenerating used or coked catalyst it will be seen that deactivation of the catalyst poisons responsible for increased coke formation is very highly desirable. Various processes or procedures have been set forth in the art for deactivation of metal contaminants upon hydrocarbon cracking catalysts. In one such operation, the catalyst, at operating temperature, is contacted with hydrogen chloride.

It has now been found that the contacting of used cracking catalyst, which is contaminated with metals and which contains these metals deposited on its surfaces, with chromyl chloride results in a marked decrease of carbon formation as well as a marked decrease in the formation of hydrogen and dry gas with a concomitant notable increase of gasoline. Obviously, to the extent that hydrogen, dry gas and coke formation are reduced the formation of gasoline and other valuable liquid products will be increased.

It is an object of this invention to deactivate poisons on contaminated cracking catalysts. It is a further object of this invention to provide a process for the deactivation of metal contaminants on used hydrocarbon cracking catalysts. A still further object of the invention is to increase gasoline and other valuable liquid products yields while concomitantly decreasing yields of hydrogen, dry gas, coke, and other less desirable products.

Other aspects, objects, and several advantages of the invention are apparent from a consideration of this disclosure and its appended claims.

According to the present invention, metal poisons, which have accumulated upon used cracking catalysts suitable for the cracking of hydrocarbons to produce gasoline and other valuable liquid products, are deactivated by contacting the used catalysts with chromyl chloride. Ordinarily the catalyst which is removed from the cracking zone and which has been stripped of residual vaporizable hydrocarbon is subjected to a regeneration operation in the presence of controlled quantities of oxidizing gases at temperatures which are well known in the art, following which the regenerated catalyst is contacted with chromyl chloride. The contacting is conveniently effected at temperatures at which the catalyst is found following regeneration and just before it is conveyed to the cracking zone. This temperature, though not limited thereto, can be in the approximate range of 700 to 1050° F. In a fixed bed unit the contacting can be effected by simply passing vapors of chromyl chloride over the regenerated bed of catalyst. In a fluid bed unit, the treatment can be effected by adding the treating agent to the catalyst in the transfer line which carries the regenerated catalyst to the reactor, or a side stream of regenerated catalyst can be withdrawn from the reactor and/or from the regenerator, and this stream can be treated continuously or batch-wise and the thus treated catalyst returned to the unit for use in the cracking reaction. Since any chromyl chloride added to the catalyst will ultimately decontaminate the same when the catalyst reaches an elevated temperature it will be obvious to one skilled in the art that chromyl chloride can be added to the catalyst at temperatures lower than those which have been set forth. The treating temperature is, therefore, not critcial. Treatment at operating temperatures such as those encompassed in the approximate range of 885–940° F. is now preferred. As noted, lower-temperature treatment, even an impregnation at ordinary temperatures, is quite satisfactory since the treated catalyst is heated to operating temperatures by the time it is used in the reactor.

The amount of treating agent which is used is small. An amount ordinarily in the range of about 0.05 to about 1 weight percent of the catalyst, added continuously or intermittently to the catalyst as it passes a point in the operation is usually satisfactory.

One of the several important advantages obtained according to the process of the present invention is that of increasing unexpectedly the length of time during which chromyl chloride-treated catalyst will operate in a decontaminated manner in comparison with catalyst treated with the conventional hydrogen chloride.

EXAMPLE

A Borger, Texas wide range gas oil boiling (5% point to 95% point) in the range 555° F.–999° F. was charged to a laboratory fluid cracking unit together with 15 pounds of process steam for each barrel of oil charged. The charge rate was 1.5 grams of oil per gram of catalyst per hour and the temperature and pressure were, respectively, 900° F. and 10 pounds per square inch gauge. A total of 100 grams of catalyst was contained in the unit which was operated on a cracking cycle of approximately 13 minutes. The data are given in terms of 50 percent conversion. The catalyst employed was a silica-alumina cracking catalyst made by acid activation of a natural clay. The catalyst had been removed from a full sized cracking unit regenerator and was contaminated with 2,255 parts per million of vanadium oxide and nickel oxide. As obtained from the regenerator, there was deposited 0.35 weight percent of coke on the catalyst. Regeneration was completed in the laboratory cracking unit before carrying out the tests which are now described.

In a first test, the regenerated catalyst was treated at an operating temperature of 900° F. with 0.26 weight percent HCl (0.25 weight percent based on chlorine) and then used in a series of cracking cycles. In a second comparative test, another sample of the catalyst was treated with 0.66 weight per cent chromyl chloride (0.23 weight percent based on chlorine). A third comparative test is shown without treatment.

*Table 1*

RESULTS OF TESTS

|  | $H_2$, Cu. Ft./bbl. | Dry Gas, Cu. Ft./ bbl. | Gasoline, Vol. percent of Feed | Carbon, Wt. percent of Feed |
|---|---|---|---|---|
| HCl Treated: |  |  |  |  |
| First Cycle | 189 | 280 | 36.2 | 4.90 |
| Fourth Cycle | 204 | 293 | 36.2 | 4.96 |
| Chromyl Chloride Treated: |  |  |  |  |
| First Cycle | 200 | 285 | 36.4 | 4.77 |
| Second Cycle | 128 | 183 | 36.8 | 4.10 |
| Fifth Cycle | 178 | 271 | 36.4 | 4.75 |
| No Treatment | 335 | 432 | 35.1 | 6.4 |

Study of the foregoing data shows that chromyl chloride is an effective cracking catalyst metal contaminant deactivator. Furthermore, these data show that chromyl chloride is more effective than hydrogen chloride. Indeed, in addition to a rather marked, longer lasting effect which is obtained using chromyl chloride than is obtained using chlorine in the form of hydrochloric acid there is obtained a marked reduction in the formation of hydrogen and dry gas. There is also obtained a notable reduction of carbon formed on the catalyst. Thus averaging the carbon formed in the two cases a reduction of almost eight percent of carbon formed is obtained. This is a very large reduction as one skilled in the art will agree.

Since it is clear that the chromyl chloride functions to deactivate the metal contaminants upon the catalyst the exact nature of the catalyst is not critical in the sense that various cracking catalysts can be used according to the invention to obtain the beneficial results of the invention. Furthermore, the charge stock is not critical in the sense that it need only have the contaminants which deposit on the catalyst to permit the process of the present invention to be practiced.

Reasonable variation and modification are possible within the scope of the foregoing disclosure and the appended claims to the invention, the essence of which is that a used metal-contaminated cracking catalyst is contacted with chromyl chloride to deactivate the metal contaminant.

I claim:

1. The deactivation of contaminants on contaminated cracking catalysts which comprises contacting the same with chromyl chloride.

2. The deactivation of metal contaminants upon used hydrocarbon cracking catalysts which comprises contacting the same at an elevated temperature with chromyl chloride in small amounts.

3. A process for cracking a hydrocarbon such as gas oil, in the presence of a catalyst such as silica-alumina catalyst made by acid activation of a natural clay, which comprises contacting said oil with said catalyst under cracking conditions, obtaining a stream of cracked products and a contaminated catalyst, regenerating said catalyst to remove coke therefrom, then contacting the catalyst with chromyl chloride and then returning said catalyst for use for further cracking of said oil.

4. A process according to claim 3 wherein the amount of chromyl chloride used is in the range of 0.05–1 weight percent of the catalyst and the temperature is in the approximate range of 885–940° F.

5. A process of deactivating contaminants on a contaminated silica-alumina hydrocarbon cracking catalyst which comprises contacting said catalyst with chromyl chloride at a temperature and for a time effective to cause deactivation of said contaminants with respect to further use of said catalyst for cracking of hydrocarbon.

References Cited in the file of this patent

UNITED STATES PATENTS 2,764,557     Doherty et al. _____ Sept. 25, 1956

OTHER REFERENCES

"Modern Inorganic Chem.," J. W. Mellor, Longman's Green and Co., New York, 1925, pages 560 and 563.